United States Patent [19]

Speraw

[11] 4,179,791

[45] Dec. 25, 1979

[54] VARIABLE FIT FASTENER

[75] Inventor: Floyd G. Speraw, Cambridge, Ohio

[73] Assignee: NCR Corporation, Dayton, Ohio

[21] Appl. No.: 856,823

[22] Filed: Dec. 2, 1977

[51] Int. Cl.² .............................................. F16B 19/00
[52] U.S. Cl. .................... 29/526 R; 24/73 P; 85/5 R; 85/81
[58] Field of Search .................. 85/1 S, 5 R, 8.1, 8.3, 85/80, 81, 85; 29/526; 24/208 A, 73 P, 73 MF, 213

[56] References Cited

U.S. PATENT DOCUMENTS

| | | | |
|---|---|---|---|
| 562,491 | 6/1896 | Schoup | 85/5 R X |
| 916,995 | 4/1909 | Carr | 85/5 R X |
| 2,090,167 | 8/1937 | Wiley | 85/5 R |
| 2,438,499 | 3/1948 | Hartman | 85/5 R |
| 2,555,420 | 6/1951 | Richardson | 85/85 |
| 3,160,053 | 12/1964 | Devine et al. | 85/5 R X |
| 3,217,584 | 11/1965 | Amesbury | 85/80 |
| 3,506,942 | 4/1970 | Alimena | 85/5 R X |
| 3,618,443 | 9/1971 | Fitzner | 85/5 R |
| 3,643,290 | 2/1972 | Milne | 248/56X |
| 3,803,670 | 4/1974 | Johnson | 85/5 R X |
| 3,815,182 | 6/1974 | Guard et al. | 85/5 R X |

FOREIGN PATENT DOCUMENTS

| | | | |
|---|---|---|---|
| 2541105 | 3/1977 | Fed. Rep. of Germany | 85/5 R |
| 647180 | 12/1956 | United Kingdom | 85/5 R |

Primary Examiner—Thomas J. Holko
Attorney, Agent, or Firm—J. T. Cavender; Wilbert Hawk, Jr.; Richard W. Lavin

[57] ABSTRACT

A two piece hand-manipulated variable fit fastener is disclosed comprising an elongated fastener member having a reduced axially extending portion permitting the fastener member to be folded on itself prior to being inserted through aligned apertures located in a pair of mating surfaces and a retainer element having a plurality of locking surfaces, the retainer element being slidably mounted on the fastener member. After insertion through the aligned apertures in the mating surfaces, the fastener element is unfolded to a position engaging one of the locking surfaces in the retainer element to lock the fastener member in the unfolded position. The positioning of the fastener member in the unfolded position also allows a pair of end shoulder portions to engage one of the mating surfaces and the retainer element to fasten the mating surfaces together.

22 Claims, 9 Drawing Figures

VARIABLE FIT FASTENER

BACKGROUND OF THE INVENTION

The present invention is directed to a multiple-part fastener for holding together in a locked condition two mating parts such as two sheets of metal and more particularly, to a fastener which will lock two flat elements together where there is no access to the area behind one of the flat elements, such fastener generally, being referred to as a "blind" fastener.

Fastening members which are designed for use in the above-cited condition are well-known in the art. Fasteners of this type are usually constructed of a central member having a collapsible portion to allow the fastener to be inserted within the aperture of the mating work pieces with the collapsible portion being released after insertion to allow the fastener to be anchored to the work pieces. Examples of this type of fastener may be found in U.S. Pat. Nos. 3,905,270, 3,643,296, 3,939,752 and 3,815,182. The fasteners disclosed in these patents are of very simple construction since once mounted they are not removable. When the fasteners are required to be removable, the construction of such fasteners becomes quite complicated and expensive. An example of this type of fastener construction can be found in U.S. Pat. No. 3,705,442. Another drawback of this type of removable fasteners that are presently available is that each fastener is constructed to be mounted within a predetermined size aperture, thereby requiring different diameter fasteners be produced to accommodate various size apertures and thus further increasing the cost of the fastener. It is therefore a principal object of this invention to provide a fastener for holding two or more mating surfaces together in a locked or fastened position which is simple in construction and therefore low in cost. It is a further object of this invention to provide a fastener which is capable of functioning in a situation wherein the aperture is blind and there is a requirement that the fastener be removable for further use. It is another object of this invention to provide a fastener which will fasten two mating parts under compression so as to withstand vibrations. It is a still further object of this invention to provide a fastener which is able to function in a variety of aperture diameters.

SUMMARY OF THE INVENTION

In order to fulfill these objects, there is provided a two piece variable fit fastener which includes an elongated fastener member having opposed shoulder ends, the fastener member having a flexible middle portion permitting the fastener member to be folded along its longitudinal axis to allow the fastener member to be inserted in aligned apertures located in mating work pieces, and a retainer ring slidably positioned on the fastener member and having a plurality of locking surfaces located therein which coacts with opposite edges of the fastener member upon the unfolding of the fastener member to a predetermined position to lock the fastener member in place after the fastener member has been inserted through the apertures. The retainer ring is formed with a slight curvature to allow one of the shoulder portions to compress the retainer ring against one of the mating surfaces to provide a compression force between the fastener member and the mating work pieces.

BRIEF DESCRIPTION OF THE DRAWINGS

Additional advantages and features of the present invention will become apparent and fully understood from a reading of the following description taken together with the annexed drawings.

DESCRIPTION OF THE PREFERRED EMBODIMENT

Figure 1:
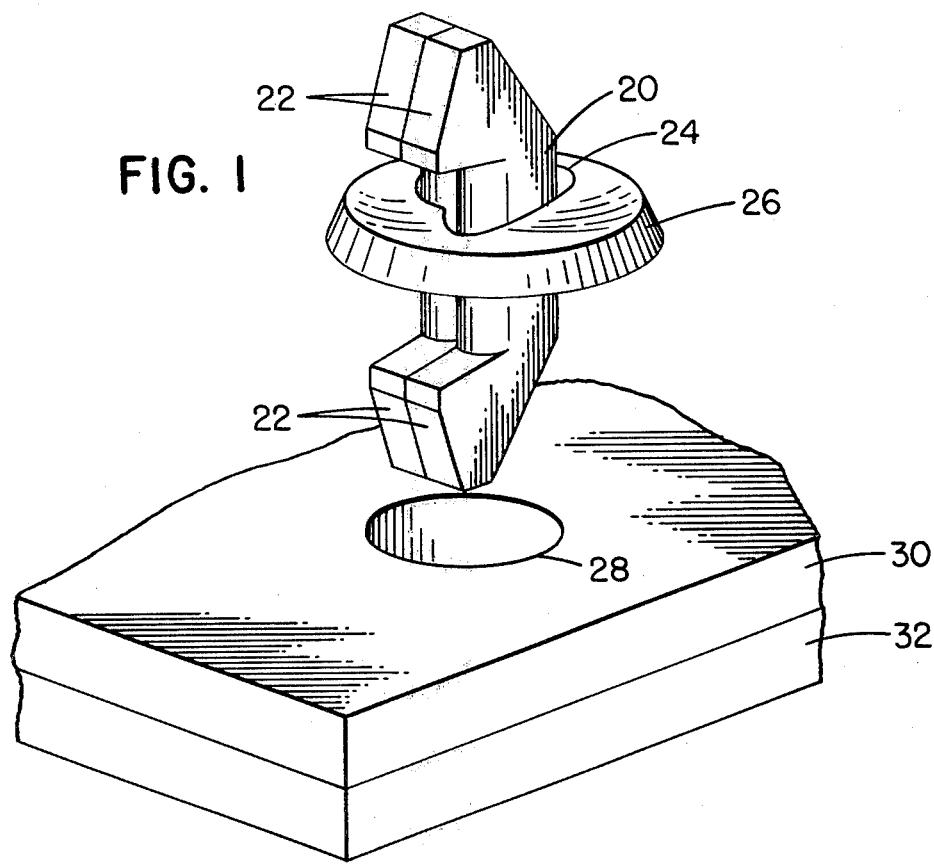
FIG. 1 is a perspective view of the fastener in a folded position prior to insertion within the aligned apertures of the mating work pieces.

Referring now to FIG. 1, there is shown a perspective view of a fastener constructed in accordance with the principles of this invention, the fastener being shown in registry with aligned apertures located in a pair of mating work pieces through which the fastener is to be inserted. The fastener includes a fastener member 20 which is constructed so as to be folded on its long axis and which includes a pair of shoulder portions 22 located at each end of the fastener member, the fastener member 20 being positioned within an aperture 24 of an associated retainer ring 26 which may be selectively positioned adjacent the shoulder portion at either end of the fastener member 20. The fastener member 20 is inserted through aligned apertures 28 located in a pair of mated work pieces 30, 32 which may take the form of metal panels. In the present embodiment, the work piece 30 is a flange portion of a printer mechanism which is mounted to a panel member 32 of a data terminal device for mounting thereon.

Figure 2:
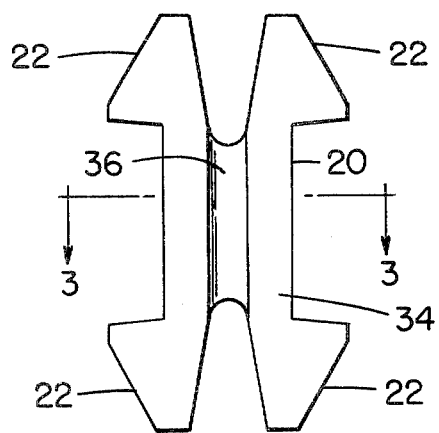
FIG. 2 is a side view of the fastener member showing the location of the axially extending reduced portion.
Figure 3:
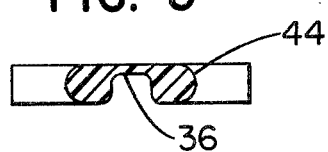
FIG. 3 is a sectional view taken on lines 3—3 of FIG. 2 showing details of the reduced portion.

Referring now to FIG. 2, there is shown a plan view of the fastener 20 which is preferably formed or molded in a configuration having an elongated body portion 34 which includes an axially extending reduced middle portion 36 (FIG. 3) facilitating the folding of the fastener along said middle portion. Formed at both ends of the body portion 34 are the shoulder portions 22 which function to grip the mating work pieces 30, 32 (FIG. 1) upon the insertion of the fastener member through the apertures 28. The present embodiment of the fastener may be molded of a linear polypropylene plastic although it is obvious that other types of materials may be used which will allow repeated folding of the fastener along the reduced portion 36 without weakening the holding capability of the fastener.

Figure 4:
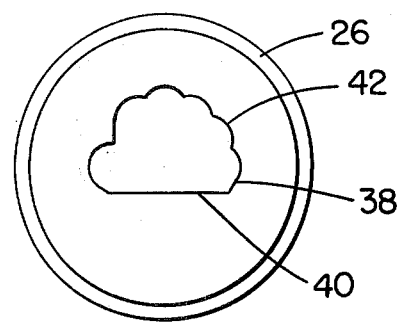
FIG. 4 is a plan view of the retainer ring showing the location of the locking surfaces.
Figure 5:
FIG. 5 is a side view of the retainer ring showing the curvature of the ring.

Associated with the fastener member 20 is the retainer ring 26 (FIGS. 1 and 4) which may be formed of any elastic material such as styrene, or of thin sheet steel, the ring 26 being formed with a slight curvature as shown in FIG. 5 and which includes an aperture 38 having a horizontal edge 40 which conforms to one side of the body portion 34 and a plurality of arcuate detent surfaces 42, (FIGS. 4, 8 and 9), each of which conforms to the configuration of the edge 44 (FIG. 3) of the body portion 34. As will be described more fully hereinafter, the detent surfaces 42 will lock the fastener member 20 in a plurality of unfolded positions (FIGS. 8 and 9) to accommodate variation in the size of the apertures 28 (FIG. 1) located in the work pieces 30, 32, in which the fastener member 20 may be inserted.

Figure 6:
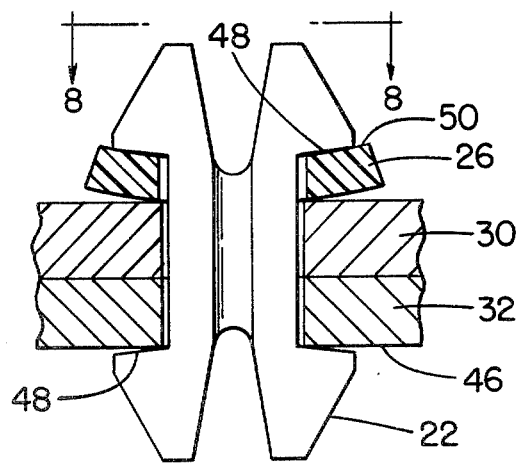
FIG. 6 is a sectional view of the fastener in a fastened position with a pair of mating work pieces with the retainer ring mounted in a concave position.

Referring now to FIGS. 6–9 inclusive, there is shown the fastener member 20 and the retainer ring 26 in various mounting configurations illustrating the advantages of the present embodiment. Prior to insertion, the fastener member 20 is folded over on itself along the reduced portion 36 to assume the configuration shown in FIG. 1. After insertion, the fastener member 20 is unfolded allowing one of the shoulder portions 22 located at one end to engage one side of the retainer ring 26 (FIG. 6) while the shoulder portion 22 of the opposite end engages the edge 46 of the work piece 32. The retainer ring 26 may be mounted adjacent the top work piece 30 in either a concave (FIG. 6) or a convex (FIG. 7) configuration allowing the fastener member 20 to fasten various thicknesses of work pieces together. As shown in FIG. 6, the underside edge 48 of each of the shoulder portions 22 are beveled so as to conform to the concave face 50 of the retainer ring 26 thereby providing maximum contact between the shoulder portions 22 and the retainer ring 26 to insure a more positive clamping engagement between the fastener member 20 and the work pieces 30, 32.

Figure 7:
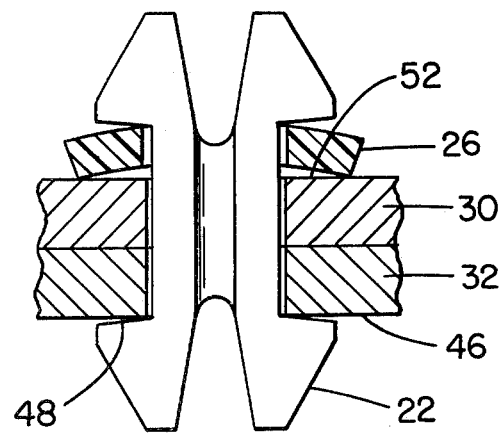
FIG. 7 is a sectional view similar to FIG. 6 showing the retainer ring mounted in a convex position.

It will be seen from FIG. 7 that the distance between the point of engagement of the underside edge 48 of the shoulder portion 22 and the top edge 52 of the work piece 30 when the ring is in a convex position, is greater than a similar distance shown in FIG. 6 when the ring 26 is in a concave position. Since the fastener member 20 has the same configuration at both its ends, moving the ring to either end of the fastener member 20 easily positions the ring in either the convex or concave configuration. In either case, the position of the ring 26 is selected so as to be slightly compressed by the engagement of the ring 26 with one of the shoulder portions 22 upon the unfolding of the fastener member 20 after insertion through the work pieces 30, 32.

Figure 8:
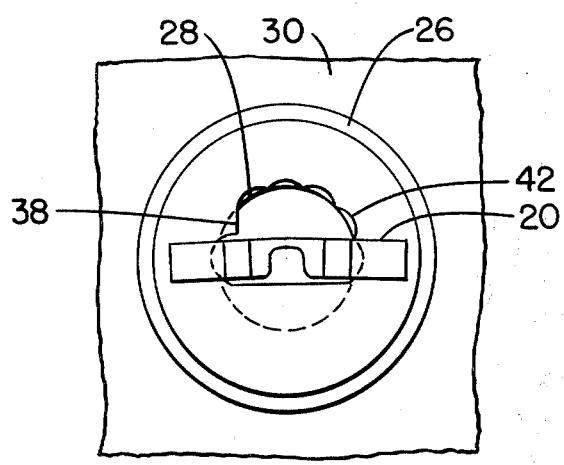
FIG. 8 is a view taken on line 8—8 of FIG. 6 showing the fastener member mounted in an over-center unfolded position which accommodates one size of aligned apertures.
Figure 9:
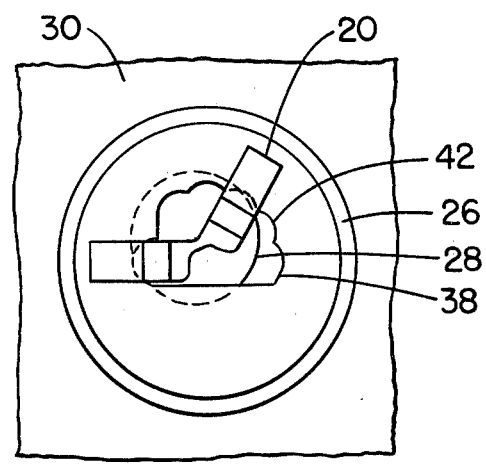
FIG. 9 is a view similar to FIG. 8 showing the same fastener mounted in a second unfolded position which accommodates a second size aperture.

As shown in FIG. 8, the unfolding of the fastener member 20 after insertion through the aligned apertures 28 in the work pieces 30, 32 may assume an over-center position with the edges 44 of the body portion 34 being located in opposite detent surfaces 42 of the aperture 38. This overcenter position, produced by the presence of the reduced center portion 36 in the body portion 34, provides a more positive locking condition than when the fastener member is unfolded and lock in a horizontal position. The locking detent surfaces 42 which are dimensioned to provide a detent action for the unfolding movement of the fastener member 20 function to lock the fastener member 20 in its unfolded position and to prevent any inadvertent folding of the fastener member. Where the diameter of the apertures 38 in the work pieces 30, 32 is less than the width of the body portion 34 when located in the unfolded position shown on FIG. 8, one side of the body portion 34 may be positioned within one of the offset detent surfaces 42 (FIG. 7), the particular detent surface 42 being selected to allow the fastener members 20 to be accommodated within the diameter of the apertures 28. To remove the fastener member 20 from the apertures 28, the fastener member is simply rotated to its folded position (FIG. 1) and then withdrawn from the apertures 28. It will be seen from this construction that by folding the fastener member 20 on itself, the fastener member can be easily inserted through the aperture 28 in the work pieces 30, 32 and then unfolded to a fastened position.

It will be apparent from the foregoing description that the present invention contemplates a fastener member of simple design which may be readily produced by the practice of conventional plastic molding methods which lends itself to a low cost construction of the fastener. While a single specific embodiment of the invention has been illustrated herein, it will be understood that variations and modifications may be effected without departing from the spirit and scope as set forth in the following claims.

The invention is claimed as follows:

1. A method of detachably fastening two co-planar work pieces together having mutually aligned apertures comprising the steps of:
   folding an elastic fastener member having oppositely disposed engaging surfaces on itself along the long axis of the fastener member;
   slidably mounting a ring member having a plurality of locking surfaces located therein on the elongated fastener member;
   inserting the folded fastener member through said apertures to position said retainer ring between one work piece and one of said engaging surfaces; and
   unfolding the fastener member to position opposite edges of the fastener member within one of said locking surfaces of said ring member positioning the fastener member in one of a plurality of unfolded positions to lock the fastener member and the ring member in a fastening position with said work pieces.

2. A fastener for detachably securing a pair of work pieces together having mutually aligned apertures for receiving the fastener, said fastener comprising:
   a foldable fastener member folded along a central axis for insertion within said aperture, said fastener member having opposed engaging surfaces;
   and a retainer member slidably mounted on said fastener member and engaged by one of said engaging surfaces upon insertion of said folded fastener member within said apertures and said retainer member, said retainer member having a plurality of locking surfaces located therein engaging said fastener member for locking said fastener member in a plurality of unfolded positions whereby said fastener member will detachably fasten said work pieces together.

3. The fastener as defined in claim 2 in which said foldable fastener member includes an elongated body member having a reduced portion extending along a central axis of the body member for enabling said fastener member to be folded and unfolded along said axis to facilitate the insertion and removal of the fastener through said apertures.

4. The fastener as defined in claim 3 in which said body member is of a generally uniform cross-section, said body member reduced portion providing a line of weakening allowing the body member to be folded along said central axis.

5. The fastener as defined in claim 3 in which said engaging surfaces comprises a pair of shoulder portions formed at each end of said body member adjacent said reduced portion whereby upon the folding of said fastener and unfolded along said central axis, said shoulder portions are positioned adjacent each other prior to the insertion of the fastener member in said apertures.

6. The fastener as defined in claim 2 in which said retainer member includes an aperture within which is positioned said fastener member, said retaining member including a plurality of locking surfaces formed in the edge of said aperture to engage said fastener member when in an unfolded position to lock said fastener member in a plurality of unfolded positions.

7. The fastener as defined in claim 6 in which each of said locking surfaces conforms to the edge of said fastener member, said locking surfaces extend along a portion of said retainer aperture to allow said fastener member to assume a plurality of unfolded positions to accommodate various sizes of aligned apertures in said work pieces.

8. The fastener as defined in claim 6 in which said retainer aperture includes a first edge portion extending in a generally horizontal direction and a second edge portion extending in a generally circular direction, said locking surfaces located in the circular edge portion of said retainer aperture to lock said fastener member in a plurality of unfolded positions.

9. The fasteners as defined in claim 8 in which said locking surfaces are formed to allow said fastener member to be snapped into engagement with a selected locking surface upon movement of the fastener to an unfolded position.

10. The fastener as defined in claim 6 in which said retainer member is formed with a curved cross-section, said retainer member being selectively positioned at either end of said body member adjacent one of said shoulder portions to vary the distance between the retainer member and the opposite shoulder portion allowing said fastener member to accommodate different work piece thicknesses.

11. The fastener as defined in claim 10 in which said retainer member is formed of an elastic material to allow said retainer member to be compressed by one of said shoulder portions upon the unfolding of said fastener member to tension said fastener member in a fastening position with said work pieces.

12. A fastener assembly for detachably securing a pair of work pieces together having mutually aligned apertures for receiving the fastener assembly, said fastener assembly comprising:
an elongated folded fastener member having oppositely disposed engaging surfaces for engaging opposite sides of said work pieces, said fastener member formed of a material allowing said fastener member to be folded on itself along a central axis for insertion within said aligned apertures; and
a curved retainer member slidably mounted on said fastener member for positioning between one of said work pieces and one of said engaging surfaces, said retainer member being formed of an elastic material allowing said retainer member to be compressed by the engaging surfaces of said fastener member upon the unfolding of said folded fastener member after insertion within the retaining member and said aligned apertures for fastening said work pieces together.

13. The fastener assembly as defined in claim 12 in which said foldable fastener member has a uniform cross-section and includes a reduced portion extending along the central axis of the fastener member for enabling said fastener member to be folded and unfolded along said central axis.

14. The fastener assembly as defined in claim 12 in which said engaging surfaces comprise a plurality of shoulder portions extending outwardly on opposite sides of said fastener member to be folded together upon the folding of the fastener member prior to insertion through said aligned apertures.

15. The fastener assembly as defined in claim 12 in which said retainer member includes an aperture within which said fastener member is slidably located, said aperture includes a plurality of locking surfaces formed along its edge and engaging opposite edges of said fastener member when in an unfolded position to lock said fastener member in said unfolded, work piece fastening position.

16. The fastener assembly as defined in claim 15 in which said fastener member is sufficiently resilient to permit snap-in engagement with said locking surfaces when moved to an unfolded position.

17. The fastener assembly as defined in claim 15 in which said retainer aperture includes a first edge portion extending in a generally horizontal direction and a second edge portion extending in a generally circular direction, said locking surfaces being located in the circular portion of said retainer aperture to lock said fastener member between a fully open position and a plurality of off-set positions to accommodate various size aligned apertures in said work pieces.

18. The fastener member as defined in claim 17 in which said locking surfaces associated with the fastener member when in a fully open position are orientated to move the fastener member to an over-center position by folding said fastener member along a reduced portion of said fastener member.

19. The fastener assembly as defined in claim 17 in which said retainer member is formed having a curved cross-section with convex and concave sides, said retainer member being selectively positioned at either end of said fastener member adjacent one of said engaging surfaces to position either of said convex or concave sides against the work piece thereby allowing said fastener member to fasten different thicknesses of work pieces together.

20. The fastener member as defined in claim 19 wherein said engaging surfaces are beveled to accommodate the concave side of said retainer member, said beveled surfaces flexing said retainer member against the work piece upon movement of the fastener member to an unfolded position to provide a fastening pressure on said work pieces.

21. A fastener assembly for detachably securing a pair of work pieces together having mutually aligned apertures shaped to receive the fastener assembly, said fastener assembly comprising;
an elongated fastener member formed of an elastic material having a body portion and oppositely disposed shoulder portions, said body portion having an axially located reduced portion allowing said fastener member to be folded and unfolded on itself, said fastener member being folded for insertion within said aligned apertures;
a retainer ring formed of a flexible material having a curved cross-section, said retainer ring having an aperture in which said fastener body portion is located to selectively position the retainer ring between one of said shoulder portions and the adjacent work piece upon insertion of the folded fastener member through said aligned apertures; and a plurality of locking surfaces formed in the edge of said retainer aperture to engage the edges of said body portion in a locking arrangement upon the unfolding of said body member to fasten the work pieces together, said locking surfaces selectively orientating said body member in a plurality of unfolded positions thereby allowing said fastener member to be inserted in a plurality of different size apertures.

22. The fastener assembly of claim 21 in which said shoulder portions are beveled to flex said retainer member against a work piece upon movement of the shoulder portion to an unfolded position.

* * * * *